United States Patent
Lawson et al.

(10) Patent No.: US 8,125,457 B2
(45) Date of Patent: Feb. 28, 2012

(54) SWITCHING DISPLAY MODE OF ELECTRONIC DEVICE

(75) Inventors: Richard James Lawson, Cupertino, CA (US); Marguerite Letulle, San Mateo, CA (US); Oluf Nissen, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1171 days.

(21) Appl. No.: 11/796,672

(22) Filed: Apr. 27, 2007

(65) Prior Publication Data

US 2008/0266255 A1  Oct. 30, 2008

(51) Int. Cl.
*G06F 3/41* (2006.01)

(52) U.S. Cl. ........................................ 345/173; 345/178

(58) Field of Classification Search .................. 345/6, 8, 345/163, 420, 168–179, 156, 423; 341/20, 341/22; 715/711; 379/433.06, 433.07; 348/169
See application file for complete search history.

(56) References Cited

U.S. PATENT DOCUMENTS

| | | | | |
|---|---|---|---|---|
| 5,268,998 A * | 12/1993 | Simpson | ........................ | 345/427 |
| 5,376,946 A * | 12/1994 | Mikan | ........................... | 345/157 |
| 5,537,528 A * | 7/1996 | Takahashi et al. | ............. | 715/255 |
| 5,923,325 A * | 7/1999 | Barber et al. | ................... | 715/711 |
| 6,121,960 A * | 9/2000 | Carroll et al. | ................ | 345/173 |
| 6,888,534 B1 * | 5/2005 | Northway | ..................... | 345/169 |
| 7,161,578 B1 * | 1/2007 | Schneider | ..................... | 345/156 |
| 7,199,787 B2 * | 4/2007 | Lee et al. | ........................ | 345/169 |
| 7,319,436 B2 * | 1/2008 | Tomisawa | ........................ | 345/6 |
| 7,663,509 B2 * | 2/2010 | Shen | .............................. | 341/20 |
| 2001/0033268 A1 * | 10/2001 | Jiang | ............................. | 345/163 |
| 2004/0027312 A1 * | 2/2004 | Owada et al. | ..................... | 345/8 |
| 2004/0108459 A1 * | 6/2004 | Furukawa et al. | ............. | 250/311 |
| 2004/0150585 A1 * | 8/2004 | Tomisawa | ........................ | 345/6 |
| 2004/0239763 A1 * | 12/2004 | Notea et al. | .................... | 348/169 |
| 2005/0231468 A1 * | 10/2005 | Chen et al. | ..................... | 345/156 |
| 2005/0240756 A1 * | 10/2005 | Mayer | .............................. | 713/2 |
| 2005/0264538 A1 * | 12/2005 | Yeh | ................................ | 345/173 |
| 2006/0111634 A1 * | 5/2006 | Wu | ................................. | 600/443 |
| 2007/0146392 A1 * | 6/2007 | Feldman et al. | ............... | 345/660 |
| 2007/0152966 A1 * | 7/2007 | Krah et al. | ..................... | 345/163 |
| 2007/0236471 A1 * | 10/2007 | Yeh | ................................ | 345/173 |
| 2007/0242069 A1 * | 10/2007 | Matsue et al. | ................. | 345/428 |

* cited by examiner

*Primary Examiner* — Prabodh M Dharia

(57) ABSTRACT

One embodiment receives a single click from a user to switch an electronic device between a mouse mode and a touch mode.

18 Claims, 4 Drawing Sheets

SWITCHING DISPLAY MODE OF ELECTRONIC DEVICE

BACKGROUND

Computers and electronic devices display icons, text, images, and other information with a size that is commensurate for use with a pointing device, such as a mouse. For example, icons and hyperlinks are sized on the screen to be clicked with a small electronic pointer appearing on the screen. Since a finger is generally larger than a pointing device, it is difficult to use touch on a display running a graphical user interface (GUI) displaying windows since the displayed targets and controls are too small.

In many computers, a user can access system level settings to change how items are displayed on the screen. For instance, a user can navigate through various menu options in a control panel to change desktop background, color, and appearances. Such changes often require numerous steps as the user navigates various windows or selections to make a system level change.

DETAILED DESCRIPTION

Figure 1:
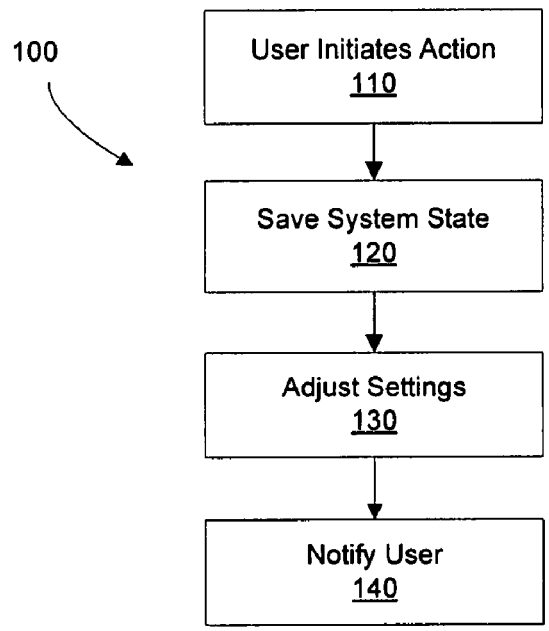
FIG. 1A is a flow diagram for switching from a mouse mode to a touch mode in accordance with an exemplary embodiment.
FIG. 1B is a flow diagram for switching back from a touch mode to a mouse mode in accordance with an exemplary embodiment.
Figure 1:
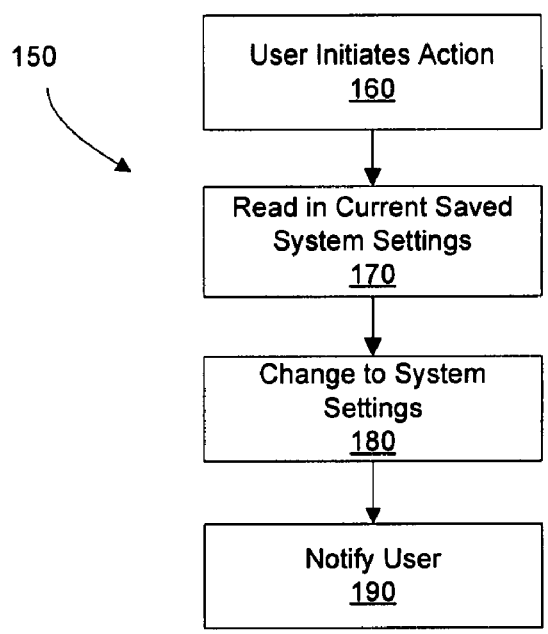

Exemplary embodiments are directed to systems, methods, and apparatus for switching back and forth between a touch interface and a mouse interface on a screen or display of an electronic device. With a single user action, the display switches from touch activation to mouse activation and vice versa.

One embodiment provides a mechanism (using software and/or hardware) that makes it convenient for the user to switch back and forth between optimizing an electronic device for use with a mouse and optimizing the electronic device for use with touch. This mechanism to switch to back and forth between a touch mode using a finger and a mouse mode using a pointing device is presented to the user in several ways. As one example, one or more hardware buttons appear on the touch screen display. When the button is pushed or activated, it executes a software program stored on the electronic device to change appearance properties. As another example, an icon is presented on the screen, such as a desktop of a personal computer (PC). When the icon is clicked or activated, a software program launches to change the appearance properties of the electronic device. As another example, movement of a pointing device (example, a mouse or movement on a touch pad) automatically launches a software program to change the appearance properties. As yet another example, when the touch screen is pushed with a user's finger, the software program launches to change the appearance properties. As yet another example, one or more physical buttons are provided on the electronic device or display that change the appearance properties when activated (example, pushed by a user). As another example, the appearance properties are changed with a menu driven selection (example, a user utilizes a pull-down or drop down menu).

In one embodiment, the appearance properties automatically change upon the occurrence of a specified event. For instance, the appearance properties change at a selected time or date or change when a designated user logins in to the electronic device. As another example the appearance properties change when a specified application is launched. For example, when a web browser is launched or a web browser window is focused, then the appearance properties automatically change to touch. Alternatively, if a particular application is not conducive for the touch mode, then the mouse mode is initiated or used with such an application. For example, when a word processing or spreadsheet application is launched or its window focused, then the appearance properties automatically change to mouse mode.

The appearance properties change as the user switches the electronic device between the touch and mouse modes. In one embodiment, the size of objects or images increases when the electronic device changes from mouse to touch modes and decreases when the electronic device changes from touch to mouse modes. By way of example, the size of objects or images changes by enlarging or shrinking the scroll bar, icons, text, tool bar, task bar, buttons, images, and/or hyperlinks, to name a few examples.

As indicated, using touch on some electronic devices (such as a PC running a windows based operating system or a GUI displaying windows) is difficult since the controls are small and designed to be used with a mouse. A windows based operating system (OS) may be, for example, a Linux based OS, a Microsoft® based OS, or an Apple® OS that uses windows, to name a few examples. One embodiment provides a quick method for users to initiate a software program that changes the OS wide appearance properties (including clicking behavior). These changes include making the controls larger or smaller depending on what user interface mode (touch or mouse) the user activates. The software program can launch manually by user action or automatically. For example, the software program launches when the mouse or cursor is moved to a designated location on the display, an icon or button is clicked, or the user touches the touch screen, to name a few examples. When in touch mode, the sizes of these controls are enlarged to make it easier for a user to view and touch the controls for inputting commands through the user interface. When in mouse mode, the sizes of these controls are made smaller thus allowing for more items to appear on the display.

In one embodiment, launching of the touch and mouse modes also alters click properties of the user interface. For instance, when the system transitions into mouse mode, then double click is activated. By contrast, when the system transitions into touch mode, then a single click is activated.

FIG. 1A is a flow diagram 100 for switching from a mouse mode to a touch mode in accordance with an exemplary embodiment. The embodiment is also applicable for switching from touch mode to mouse mode.

According to block 110, a user initiates an action or command to switch the electronic device from the mouse mode to the touch mode. This command or action can be a direct manual action (example, a user activates an icon or menu selection), or this action can be an indirect automated action (example, a user launches a program that initiates switching between modes).

In one exemplary embodiment, the action to switch between the mouse and touch modes is initiated with a single click or single user action. For example, a user performs only a single click on an icon, button, or graphical image to switch the electronic device from the mouse mode to the touch mode or from the touch mode to the mouse mode. As another example, the user presses a single logical icon, button, or graphical image on the display or presses or activates a single physical button on the electronic device to switch between modes.

According to block 120, the system state is saved. In one embodiment, an operating system state is saved or copied (example, a system snapshot is taken). The system state records current settings to enable a user to switch back and forth between modes while maintaining system settings.

According to block 130, system settings are adjusted. The system settings are adjusted to enable the system to operate in the newly selected mode. By way of example, adjustments are made to one or more of font sizes, scroll bar sizes, maximum/minimum buttons, menus, single/double click, etc. As noted, when the system changes to touch mode, then items (example, images, text, icons, etc.) are expanded or enlarged. By contrast, when the system changes to mouse mode, then items (example, images, text, icons, etc.) are shrunk or reduced.

According to block 140, a user is notified of the system change. In other words, the user is notified that the electronic device has changed from the mouse to touch modes or from the touch to mouse modes. In one embodiment, a visual and/or audible notification is provided. By way of example, a pop-up dialog box appears on the display to notify the user. As another example, an icon is presented or altered to visually indicate in which mode the system is operating.

FIG. 1B is a flow diagram 150 for switching back from a touch mode to a mouse mode in accordance with an exemplary embodiment. The embodiment is also applicable for switching back from mouse mode to touch mode.

According to block 160, a user initiates an action or command to switch the electronic device from the touch mode to the mouse mode. This action can be a direct manual action (example, a user activates an icon or menu selection), or this action can be an indirect automated action (example, a user launches a program that initiates switching between modes).

According to block 170, the system reads in the current saved system settings. As noted in block 120 of FIG. 1A, the system state is saved. In one embodiment, an operating system state is saved or copied (example, a system snapshot is taken). The system state records current settings to enable a user to switch back and forth between modes while maintaining system settings.

According to block 180, system settings are adjusted to the saved system settings. The system settings are adjusted to enable the system to operate in the previous mode (i.e., the mode before the switch is performed).

According to block 190, a user is notified of the system change. In other words, the user is notified that the electronic device has changed from the mouse to touch modes or from the touch to mouse modes. Examples of notification are discussed in connection with block 140 of FIG. 1B.

Figure 2A:
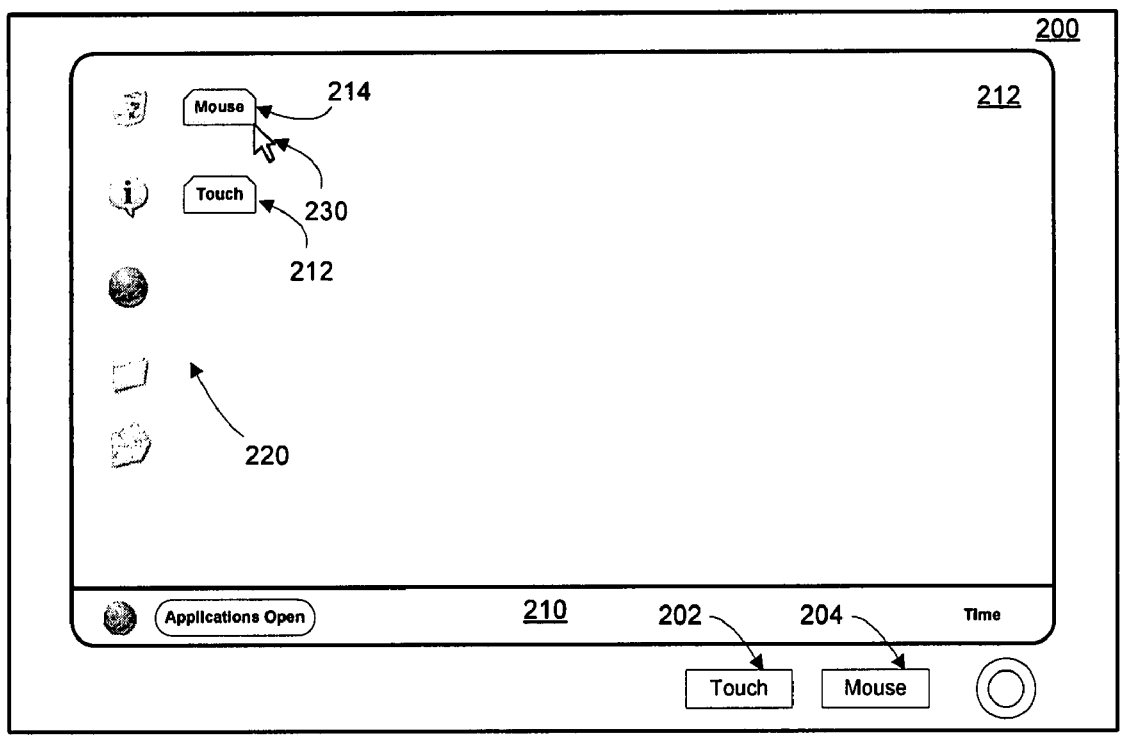
FIG. 2A is a display in mouse mode in accordance with an exemplary embodiment.
Figure 2B:
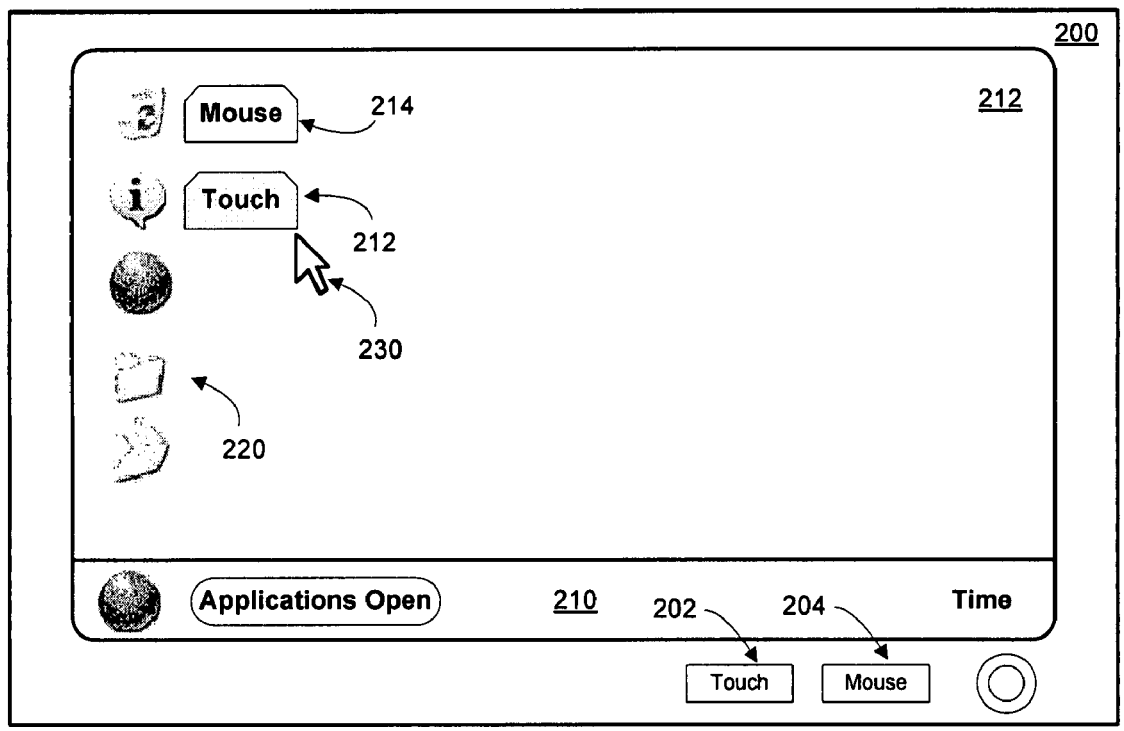
FIG. 2B is the display in FIG. 2A after being switched to touch mode in accordance with an exemplary embodiment.

FIG. 2A is a display 200 of an electronic device in mouse mode in accordance with an exemplary embodiment, and FIG. 2B shows the display in the touch mode. In one embodiment, the display 200 includes physical buttons for switching between the mouse and touch modes. By way of example, a touch button 202 and mouse button 204 are provided to activate and de-activate the mouse and touch modes.

The display 200 includes a task bar 210 having various icons, images, objects, and text and a larger display or screen area 212. The larger display area 212 also has various icons, images, objects, etc. (indicated generally at 220). Two icons are also provided for switching between the mouse and touch modes. By way of example, a touch icon 212 and a mouse icon 214 are provided to activate and de-activate the mouse and touch modes. In one embodiment, these two icons are combined into a single icon that enables a user to switch between the touch and mouse modes.

FIG. 2A shows an electronic pointer 230 activating the mouse icon 214 to switch the display to mouse mode. The mouse icon 214 is highlighted (shown as shading) to indicate the current system state is mouse mode. By contrast, FIG. 2B shows the pointer 230 activating the touch icon 212 to switch the display to the touch mode. The touch icon 212 is highlighted (shown as shading) to indicate the current system state is touch mode.

As noted, when the system state switches between mouse and touch modes, objects are enlarged or shrunken. FIG. 2B shows various objects being enlarged. By way of example, icons 212, 214, and 220 on display area 212 are enlarged. Additionally, objects in the task bar 210 are also enlarged.

Figure 3A:
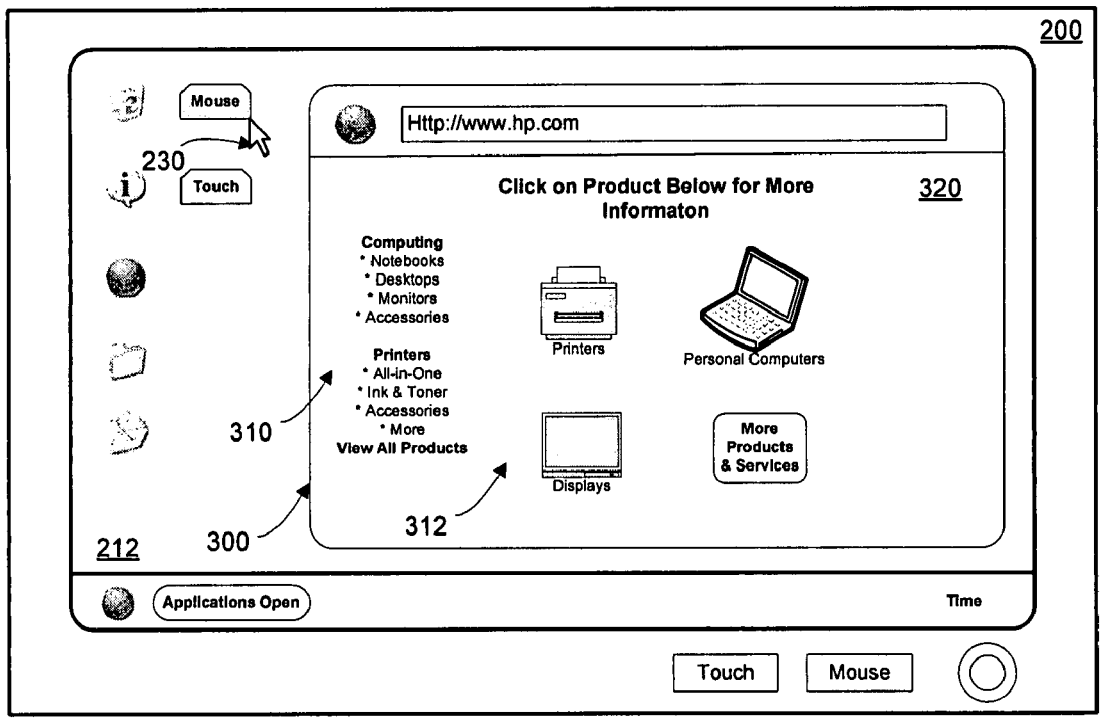
FIG. 3A is a display in mouse mode in accordance with an exemplary embodiment.
Figure 3B:
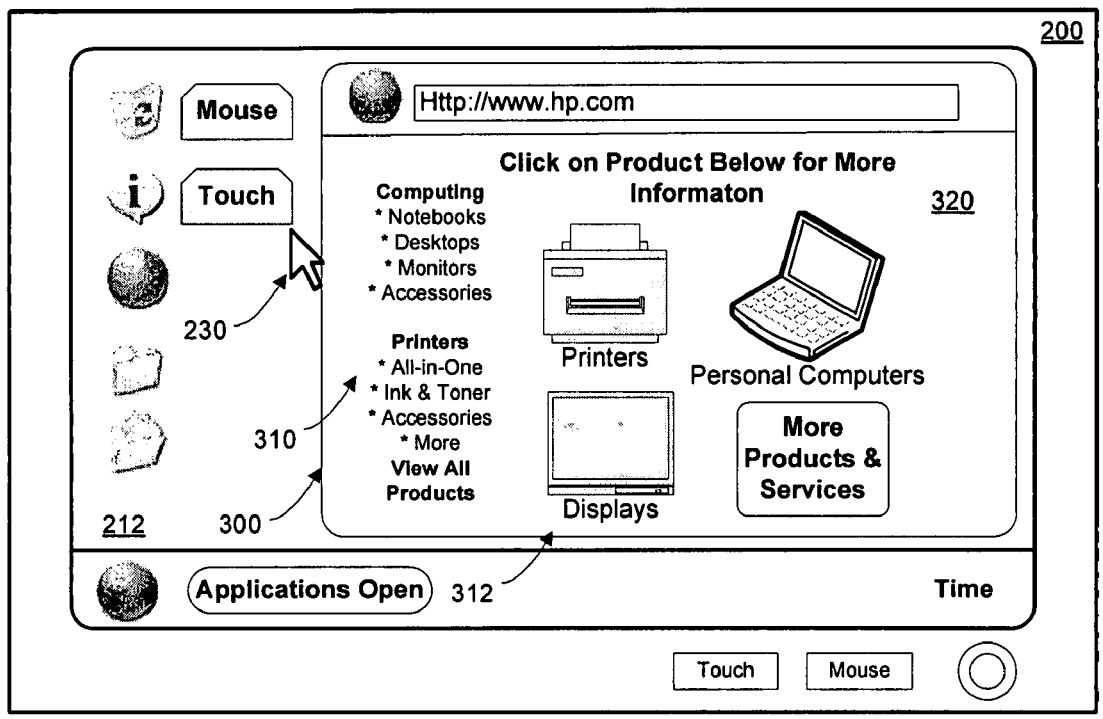
FIG. 3B is the display in FIG. 3A after being switched to touch mode in accordance with an exemplary embodiment.

In one embodiment, objects in applications are enlarged in the touch mode and shrunken in the mouse mode. FIGS. 3A and 3B show the display 200 having an open application 300 (shown by way of example as a web browser). In FIG. 3A, the display 200 is in mouse mode. In this mode, the text 310 and images 312 in the browser window 320 are sized for interacting with a pointing device (example pointer 230).

In FIG. 3B, the display 200 is in touch mode. In this mode, the text 310 and images 312 in the browser window 320 are sized for interacting with a finger of a user. Here, the size of the text and images has increased relative to the sizes in FIG. 3A. By way of example, text 310 includes enlarged hyperlinks that are activated when a finger of the user touches the touch sensitive screen (example, touching "Notebooks" causes browser to navigate to a new world wide web location).

Figure 4:
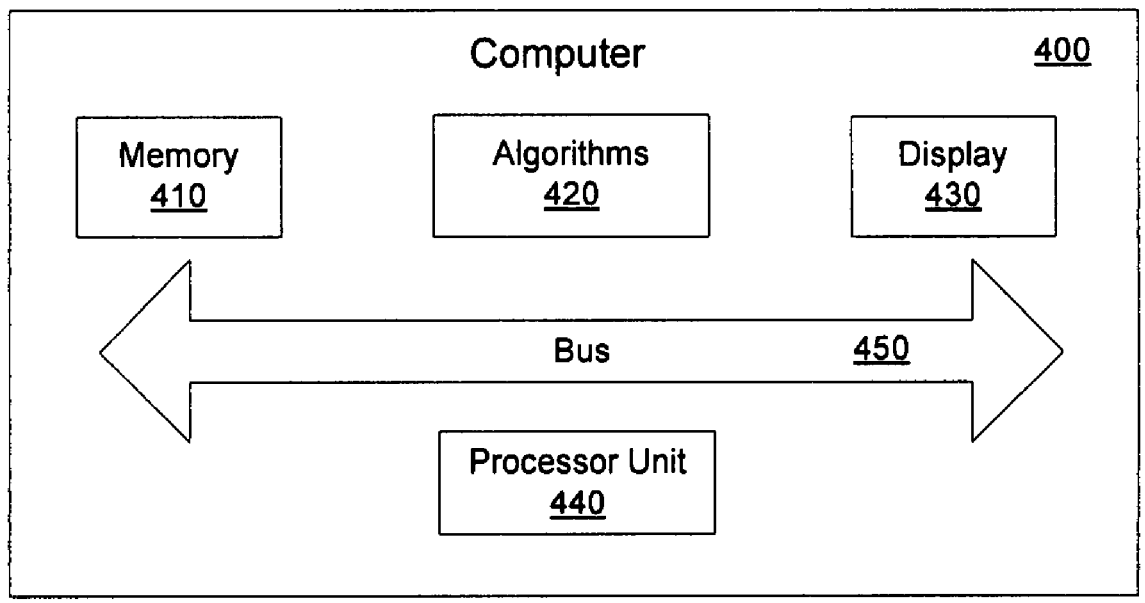
FIG. 4 is a block diagram of an electronic device in accordance with an exemplary embodiment.

FIG. 4 is a block diagram of an electronic device or computer 400 in accordance with an exemplary embodiment of the present invention. In one embodiment, the electronic device includes memory 410, one or more algorithms 420 (example, algorithms for implementing one or more aspects of exemplary embodiments), a touch sensitive display 430, processing unit 440 and one or more buses 450.

In one embodiment, the processor unit includes a processor (such as a central processing unit, CPU, microprocessor, application-specific integrated circuit (ASIC), etc.) for controlling the overall operation of memory 410 (such as random access memory (RAM) for temporary data storage, read only memory (ROM) for permanent data storage, and firmware). The memory 410, for example, stores applications, data, programs, algorithms (including software to implement or assist in implementing embodiments in accordance with the present invention) and other data. The processing unit 440 communicates with memory 410 and display 430 via one or more buses 450.

As used herein, the word "click" or "clicking" means to tap or press and release an icon or a button (such as a mouse button) of an electronic device. In the mouse mode, clicking is used to select a screen object by moving a pointer to the position of the object and then clicking a mouse button or tapping a pad. In the touch mode, the display functions as a user interface for receiving touch input from a user, and clicking is accomplished by the user touching an icon on the display.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving a single click from a user to switch an electronic device between a mouse mode in which clicking a pointer moved on an object displayed on a display of the electronic device selects the object and a touch mode in which touching the object displayed on the display of the electronic device selects the object;
enlarging visual objects in an application displayed on the display when the electronic device switches from the mouse mode to the touch mode; and,
shrinking the visual objects in the application displayed on the display when the electronic device switches from the touch mode to the mouse mode;
wherein the visual objects are shrunk such that the visual objects are still displayed on the display after switching to the mouse mode from the touch mode,
and wherein the visual objects that are enlarged when switching from the mouse mode to the touch mode are the visual objects that were displayed on the display prior to switching from the mouse mode to the touch mode.

2. The method of claim 1 further comprising, switching from the mouse mode to the touch mode by receiving the single click from an electronic pointer on the display.

3. The method of claim 1 further comprising, switching from the touch mode to the mouse mode by receiving the single click from a touch of a user on an icon displayed on the of a display.

4. The method of claim 1, wherein the single click is from actuating a physical switch or button on or near the display.

5. The method of claim 1 further comprising, automatically enlarging icons, text, and hyperlinks on displayed on the display when the electronic device switches from the mouse mode to the touch mode.

6. The method of claim 1 further comprising:
saving operating system settings of the mouse mode;
changing back to the operating system settings when the electronic device switches from the touch mode back to the mouse mode.

7. A computer readable medium having instructions for causing a computer to execute a method, comprising:
altering a size of plural icons on a display of an electronic device upon receiving a command from a user to switch between a first mode that uses a user interface of the electronic device to receive input from clicks and a second mode that uses the user interface of the electronic device to receive input from touch,
such that the plural icons are enlarged in size on the display when the electronic device switches from the first mode to the second mode,
and such that the plural icons are shrunk in size on the display when the electronic device switches from the second mode to the first mode;
wherein the visual objects are shrunk such that the visual objects are still displayed on the display after switching to the first mode from the second mode,
and wherein the visual objects that are enlarged when switching from the first mode to the second mode are the visual objects that were displayed on the display prior to switching from the first mode to the second mode.

8. The computer readable medium of claim 7, the method further comprising:
detecting a touch on the display in the second mode to switch the electronic device from the second mode to the first mode.

9. The computer readable medium of claim 7, the method further comprising:
detecting activation of a physical button or switch located on or near the display to switch the electronic device between the first and second modes.

10. The computer readable medium of claim 7, the method further comprising:
launching an application in the electronic device to switch the electronic device from the first mode to the second mode.

11. The computer readable medium of claim 7, the method further comprising:
receiving a click of an icon on the display to switch the electronic device from the first mode to the second mode.

12. The computer readable medium of claim 7, the method further comprising:
switching from the first mode to the second mode when a web browser application is activated.

13. The computer readable medium of claim 7, the method further comprising:
enlarging icons in a task bar and hyperlinks in a display area upon switching the electronic device from the first mode to the second mode.

14. An electronic device, comprising:
a display;
memory for storing an algorithm; and
processor for executing the algorithm to:
enlarge and shrink sizes of icons on the display upon receiving activation from a user to switch between first and second modes of system operation, wherein the first mode receives user input from clicks on the display of the electronic device and the second mode receives user input from touch on the display of the electronic device, such that the icons are enlarged in size on the display when the electronic device switches from the first mode to the second mode, and such that the icons are shrunk in size on the display when the electronic device switches from the second mode to the first mode;

wherein the visual objects are shrunk such that the visual objects are still displayed on the display after switching to the first mode from the second mode, and wherein the visual objects that are enlarged when switching from the first mode to the second mode are the visual objects that were displayed on the display prior to switching from the first mode to the second mode.

15. The electronic device of claim 14 further comprising, a button on the electronic device for switching the electronic device from the first mode to the second mode.

16. The electronic device of claim 14 further comprising, a button on the electronic device for switching the electronic device from the second mode to the first mode.

17. The electronic device of claim 14, wherein the processor further executes the algorithm to automatically switch from the first mode to the second mode when a web browsing application is launched.

18. The electronic device of claim 14, wherein the processor further executes the algorithm to automatically switch from the second mode to the first mode when a user moves a mouse on the display.

* * * * *

UNITED STATES PATENT AND TRADEMARK OFFICE
CERTIFICATE OF CORRECTION

PATENT NO.        : 8,125,457 B2                              Page 1 of 1
APPLICATION NO.   : 11/796672
DATED             : February 28, 2012
INVENTOR(S)       : Richard James Lawson et al.

It is certified that error appears in the above-identified patent and that said Letters Patent is hereby corrected as shown below:

In column 5, line 65, in Claim 3, delete "of a display." and insert -- display. --, therefor.

Signed and Sealed this
Eighth Day of January, 2013

David J. Kappos
*Director of the United States Patent and Trademark Office*